J. D. HOUCK.
CAN OPENER.
APPLICATION FILED SEPT. 7, 1911.

1,042,917.

Patented Oct. 29, 1912.

WITNESSES:

INVENTOR
John D. Houck,
BY
Attorney

UNITED STATES PATENT OFFICE.

JOHN D. HOUCK, OF CHICAGO, ILLINOIS.

CAN-OPENER.

1,042,917.      Specification of Letters Patent.      Patented Oct. 29, 1912.

Application filed September 7, 1911. Serial No. 648,229.

*To all whom it may concern:*

Be it known that I, JOHN D. HOUCK, a citizen of the United States, residing at Chicago, in the county of Cook and State of Illinois, have invented certain new and useful Improvements in Can-Openers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in can openers and the object in view is to produce a simple and efficient device of this nature, consisting essentially in the provision of a member having a puncture hook upon which a handle has a sliding movement, the puncture hook forming a pivotal center for a cutting knife, and in the provision of a fixed sleeve carrying a separate cutting knife.

The invention comprises various details of construction and combinations and arrangements of parts which will be hereinafter fully described, shown in the accompanying drawings and then specifically defined in the appended claim.

I illustrate my invention in the accompanying drawing, in which:—

Figure 1:
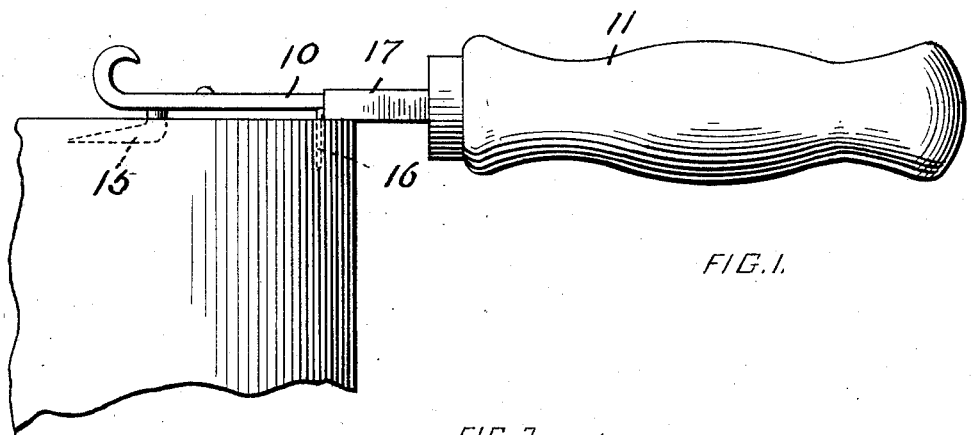
Figure 2:
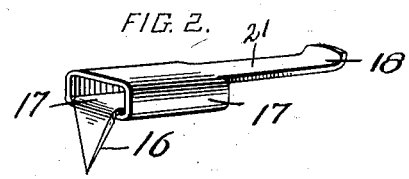
Figure 3:
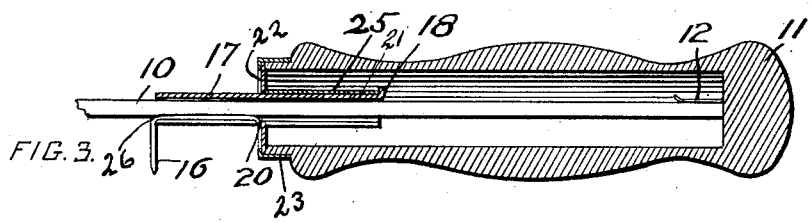

Figure 1 is a side elevation showing the opener as applied to a can Fig. 2 is a detail perspective view of the cutter blade carrying sleeve, and Fig. 3 is a detail sectional view of the fastening means for the shank portion of the member carrying the puncture hook.

Reference now being had to the details of the drawings by numeral, 11 designates a hollow handle, and 25 designates an open-ended shell which is held within the chambered portion of the handle and adapted to receive the member 10, which passes loosely therethrough, and which member carries a puncture hook 15, serving as a pivotal center in cutting an opening in the end of the can. A sleeve, designated by numeral 17, is provided with a contracted extension 21 which is bent at an angle at one end as at 18, said contracted projection being adapted to pass through said shell and its angled end engages over the inner end of said shell and serves to hold the sleeve from movement in one direction, while its movement in the opposite direction is limited by the inner end of the sleeve being held in contact with the slotted disk 22 which latter is held in place by means of a flanged ring 23, fitted over a shouldered portion of the handle. The slot in said disk receives the contracted extension 21 of said sleeve, as shown clearly in Fig. 3. A cutting blade 16 is bent at an angle at 26 and its shank portion extends through said sleeve and its inner end is bent at an angle at 20 and engages over the inner end of the sleeve 17. The cutting blade, when adjusted within the shell, is held in place by the shank portion of the member 10, the latter being adapted to have a sliding movement in contact with the shank of the cutting blade as the latter is held stationary.

In order to hold the member 10 at its farthest inner limit, against accidental outer movement, a spring 12 projects from the inner end of the chambered portion of the shank portion of the handle and against which said member frictionally contacts.

The operation of my can opener will be readily understood and is as follows:—A person by taking hold of the handle may cause the puncture hook to be pushed through the end of the can to be cut, the shank of the hook forming a pivotal center, after which the operator may move the handle to position the cutting blade to cut the desired size of opening. By applying pressure to the cutting blade it may be pushed through the end of the can, after which, by causing the handle to describe a circle, a disk may be cut from the end of the can, the beveled edges of the cutting knife serving to turn down the rough edge, thus forming a clean edge to the opening in the can.

It will be noted from the foregoing that the sleeve through which the shank portion of the puncture hook passes is at all times held stationary, as is also the knife which is separate from the sleeve, while the handle may be moved back and forth upon the member 10 for the purpose set forth.

What I claim to be new is:—

A can opener comprising a hollow handle, a slotted disk fitted to the chambered end thereof, an open-ended shell mounted within the handle, a stationary sleeve bearing against said disk and having an extended portion passing through said disk and shell and provided with an angled end engaging over the inner end of the shell, a cutting blade having a shank portion passing through the sleeve and angled at its inner end and engaging over the inner end of the sleeve and against said disk, a member passing through said sleeve and shell and holding said cutting blade within the sleeve, and a puncture hook projecting from said member, as set forth.

In testimony whereof I hereunto affix my signature in the presence of two witnesses.

JOHN D. HOUCK.

Witnesses:
    JAMES A. DONNELLY,
    HARRIE S. BICKFORD.

Copies of this patent may be obtained for five cents each, by addressing the "Commissioner of Patents, Washington, D. C."